United States Patent
Erickson et al.

(10) Patent No.: US 6,305,631 B1
(45) Date of Patent: Oct. 23, 2001

(54) TAPE CARTRIDGE WITH REMOVE TO OPERATE TAPE AND HUBS

(75) Inventors: Leif O. Erickson, River Falls, WI (US); Arne B. Boberg, Shoreview, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/406,946

(22) Filed: Sep. 28, 1999

(51) Int. Cl.$^7$ ................................................ G11B 23/087
(52) U.S. Cl. .................... 242/345; 242/338.2; 242/340; 242/342; 360/95
(58) Field of Search .............................. 242/345, 347.2, 242/338, 338.2, 340, 341, 342, 343, 352.3, 352.4, 334.3, 334.4, 347, 333.7; 360/95, 96.1, 132, 134, 137; 206/391, 393, 307, 387.1

(56) References Cited

U.S. PATENT DOCUMENTS

| | | |
|---|---|---|
| 1,871,233 | 8/1932 | Proctor . |
| 1,932,401 | 10/1933 | Foster . |
| 3,096,038 | 7/1963 | Fundingsland . |
| 3,520,495 | 7/1970 | Sotani . |
| 4,385,331 * | 5/1983 | Schoettle et al. .................... 360/96.1 |
| 4,453,683 | 6/1984 | Reimer et al. . |
| 4,492,351 | 1/1985 | Zoellner . |
| 4,523,133 | 6/1985 | Messenger . |
| 4,526,330 | 7/1985 | Shimizu . |
| 4,664,337 | 5/1987 | Shiratori . |
| 4,694,369 | 9/1987 | Ramsay . |
| 4,848,698 * | 7/1989 | Newell et al. . |
| 4,986,490 * | 1/1991 | Tranquilla ............................. 242/338 |
| 5,199,661 * | 4/1993 | Gelardi et al. .................... 242/345 X |
| 5,297,753 | 3/1994 | Abe . |
| 5,415,360 | 5/1995 | Kim et al. . |
| 5,692,695 | 12/1997 | Park . |
| 5,777,830 * | 7/1998 | Wrobel et al. ........................ 360/132 |
| 5,908,168 | 6/1999 | Solhjell . |
| 5,911,379 * | 6/1999 | Adams .............................. 242/347.1 |
| 5,963,403 * | 10/1999 | Shimomura et al. ................ 360/132 |
| 5,979,814 * | 11/1999 | Childers ........................... 242/345 X |

FOREIGN PATENT DOCUMENTS

| | | |
|---|---|---|
| 836317 | 1/1976 | (BE) . |
| 2610186 | 9/1977 | (DE) . |
| 10-222949 | 8/1998 | (JP) . |
| 11-16320 | 1/1999 | (JP) . |

* cited by examiner

*Primary Examiner*—William A. Rivera
(74) *Attorney, Agent, or Firm*—Eric D. Levinson (57) ABSTRACT

A tape cartridge includes a first rotatable hub and a second rotatable hub. The first hub and the second hub are wound so that they are substantially full of the flexible recording tape. The flexible tape between the first and second hub crosses a centerline including the two hubs. Both the first rotatable hub and the second rotatable hub are removable from the cartridge. The hubs have a flange with a conical edge which nests into a first opening and a second opening in the tape cartridge with conical receiving surfaces. The conical edges have a plurality of reliefs therein to form conical teeth within each of the first and second hub. The conical teeth of one of the hubs engages the reliefs of the other hub to seal the cartridge and to support the tape between the hubs. The cartridge also includes a base, a latch for engaging the first rotatable hub and the second rotatable hub. A cartridge cover covers the latch and base. The tape cartridge is placed into a tape drive for reading and writing to tape media within a tape cartridge. The tape drive includes an apparatus for removing the first hub and second hub from the tape cartridge. The tape drive also includes a first spindle attached to a first arm and a second spindle attached to a second arm. The arms move the first spindle and the second spindle between a hub receiving position and a functional position. In the functional position, the first spindle and the second spindle position the tape near the transducer in a transducing relationship. Each of the spindles may include a hub flange extension or a tape packer.

23 Claims, 9 Drawing Sheets

TAPE CARTRIDGE WITH REMOVE TO OPERATE TAPE AND HUBS

FIELD OF THE INVENTION

The invention relates to a high performance tape cartridge. More particularly, the invention is directed toward a tape cartridge which devotes a high percentage of its volume to tape storage, and to a tape drive for this cartridge.

BACKGROUND OF THE INVENTION

Tape is a known medium or media for the storage of audio, video, and computer information. The information is typically written to and read from the tape magnetically and/or optically. Such tapes are available spooled on individual hubs and in single or dual hub tape cassettes/cartridges. The tape path for any type of tape cartridge and tape drive includes a tape head in close proximity to the tape. Many tape cartridges include an opening through which a tape head from a tape drive is inserted. The tape in a single hub tape cartridge also has an opening through which tape passes. The tape is accessed through the opening and then mechanically threaded through an external tape path and spooled onto a take-up hub after insertion into a tape drive device. The tape head has one or more transducer elements for writing to and/or reading from the tape.

Cassettes or cartridges including tape are commonly used to back up computer information from all types of computer systems. In work environments, tape is used to back up data or information on a regular basis. Tape and tape cartridges store vast amounts of data. In some instances, tape cartridges are used in a library which includes a tape drive coupled with a picking mechanism and a storage area for storing a number of tape cartridges. The tape cartridges in the storage area are accessible by the picking mechanism. The picking mechanism is controlled so that the picking mechanism picks a selected tape cartridge from it$^L$F particular position in the storage area, and inserts the tape cartridge into the tape drive when the information on the particular tape cartridge is requested. The picking mechanism removes the tape cartridges from the tape drives and returns them to the storage area when the information is no longer needed.

When analyzing the different digital recording cartridges on the market, all have advantages and weaknesses. In general, there are two types of tape cartridges—the tape cartridge with a single hub and the tape cartridge with a double hub. The single hub cartridges have good capacities and low price, but have longer access times. In other words, it takes longer to get to the data than with a center park two hub cartridge.

In tape libraries, two hub cartridges with center park are preferred for their superior access time performance. Two hub cartridges which are center parked have better access time to data but have very little volume of the cartridge devoted to tape and therefore are less efficient in terms of using space. Two hub cartridges have either half the length of tape on one hub and the other half of the tape on the other hub in a two hub cartridge; or the full tape on one hub with the other hub empty; or portions of the tape of the full tape on one hub and portions of the full tape on the other hub. In this manner, the data is, at most, half the length of the tape away from its center parked position. The volume of tape compared to the volume of the cartridge is low since there are generally tape guides and other pins for providing a tape path within the cartridge. The additional pins and tape guides provide tape tracking but add to the cost of the cartridge and to the complexity of manufacture. Since each hub must have the capacity to hold the entire length of tape within the two hub cartridge on each of the hubs, tape capacity is lost since each hub is not filled with tape. In other words, each hub must have capacity in the event the entire tape is shuttled to one or the other of the hubs. The result is that a small percentage of the volume of the cartridge is tape. Generally, the volume of the cartridge devoted to tape is in the range of 7% to 10% of the total volume of the cartridge. Newer style, center park cartridges are generally costly. The many parts required add to the complexity of manufacture of the cartridges.

The recording capacity per cartridge is becoming increasingly important especially in tape library systems. As a result, there is a need for a two hub cartridge which can be center parked so that access to data is short. In addition, there is a need for a two hub cartridge which can hold a high volume of tape so that volumetric efficiency of the tape cartridge and the tape library which uses such a cartridge can be increased. In addition, there is a need for a cartridge which is easy to manufacture and which can be made inexpensively.

SUMMARY OF THE INVENTION

A tape cartridge includes a first rotatable hub and a second rotatable hub. A flexible recording tape is wound upon the first rotatable hub and the second rotatable hub. The first hub is wound so that it is substantially full of the flexible recording tape. The second hub is also wound so that it is substantially full of the flexible recording tape. The flexible recording tape is wound on the first hub in a first direction and wound upon the second hub in a second direction. The flexible tape between the first rotatable hub and the second rotatable hub crosses a plane including the axis of rotation of the first hub and a point on the line defining the axis of rotation of the second hub. Both the first rotatable hub and the second rotatable hub are removable from the cartridge. The hubs have a flange with a conical edge which nests into a first opening in the tape cartridge with a conical receiving surface and a second opening in the tape cartridge with a conical receiving surface. The conical edges have a plurality of reliefs therein to form conical teeth within each of the first and second hub. The conical teeth of one of the hubs engages the reliefs of the other hub. The teeth of one of the conical edges of the hubs can be unevenly spaced to lessen the distance needed to have the first and second hub engage one another. The cartridge also includes a base, a latch for engaging the first rotatable hub and the second rotatable hub. The latch is attached to the base. A cartridge cover covers the latch and base and also attaches to the base. The tape cartridge is placed into a tape drive for reading and writing to tape media within a tape cartridge.

The tape drive includes a transducing head for reading representations of data from the tape and for writing representations of data to the tape, and an apparatus for removing the first hub and second hub from the tape cartridge. The tape drive also includes a first spindle attached to a first arm and a second spindle attached to a second arm. A first arm moves the first spindle between a hub receiving position and a functional position. Similarly, a second arm moves the spindle between a hub receiving position and a functional position. In the functional position, the first spindle and the second spindle position the tape near the transducer in a transducing relationship. Each of the spindles may include a hub flange extension which aids in winding tape onto the first hub and the second hub. The hub flange extensions also provide capacity to the first hub and the second hub so that substantially all of the tape within the two hub tape cartridge can be placed on one of the first hub and the second hub. The tape drive may also include tape packers for each of the first hub and the second hub. The tape packers would be mounted onto a third arm and a fourth arm. The tape drive includes a mechanism for disengaging the latch on the tape cartridge. The tape drive also includes an apparatus for moving the portion of the tape cartridge other than the first hub and the second hub and the tape wound thereon, relative to the first hub and the second hub. In other words, the hubs can be dropped away from the cartridge or the cover and base can be lifted off the first hub and second hub.

In operation, the tape cartridge is positioned so that a first hub engages the a first spindle and so that the second hub engages a second spindle. The first and second hubs are then removed from the tape cartridge. The arms which carry the spindles are initially positioned so that the first hub and the second hub can be received. The hubs are locked onto the spindles. The first spindle and the second spindle are then moved to a second position where the tape between the first spindle and the second spindle passes over a transducing head. Hub flange extensions can be placed near the first hub and the second hub after the second or functional position is reached. A first tape packer may then be placed onto the tape pack of the first hub and a second tape packer may then be placed onto the tape pack of the second hub.

Advantageously, inventive two hub tape cartridge has two hubs each of which holds a full tape pack. The resulting two hub cartridge holds a higher volume of tape with respect to the volume of the tape cartridge than current two hub cartridges. The volumetric efficiency of the inventive two hub tape cartridge increases. The volumetric efficiency of a tape library which using such a cartridge also increases. The two hub cartridge can be center parked so that access to data is minimized. In addition, the inventive two hub cartridge has less parts than current two hub cartridge designs and is therefore, less expensive and easier to manufacture. The drive also mounts the hubs from the two hub cartridge onto moveable spindles. The spindles move from a load position to a functional position. As they move to the functional position, the tape is wrapped around the head and the guides of the tape drive. This load cycle is faster and more reliable than the load cycle associated with a single hub cartridge since no tape threading will be required.

BRIEF DESCRIPTION OF THE DRAWINGS

The following detailed description of the preferred embodiments can best be understood when read in conjunction with the following drawings, in which.

DETAILED DESCRIPTION OF THE PREFERRED EMBODIMENT

Figure 1:
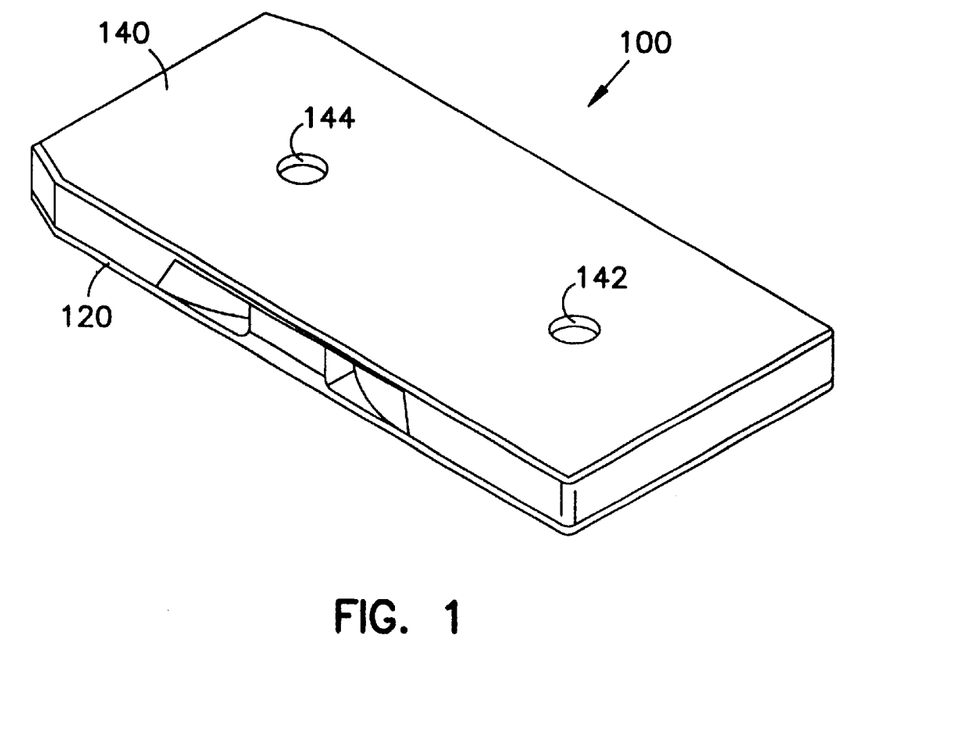
FIG. 1 shows a isometric view of a tape cartridge having two full tape packs.

FIG. 1 shows an isometric view of a tape cartridge 100. The tape cartridge 100 includes a box-like housing formed by a mount plate or base 120 and a cover 140. Cover 140 is secured to base 120 by mechanical fasteners, welding or bonding the cover 140 to the base 120. The mechanical fasteners are typically screws. Cover 140 also includes two openings 142 and 144 which expose portions of a first tape hub 220 and a second tape hub 240 (also shown in FIG. 2). Unlike other tape cartridges, there is no tape access opening in the cover 140.

Figure 2:
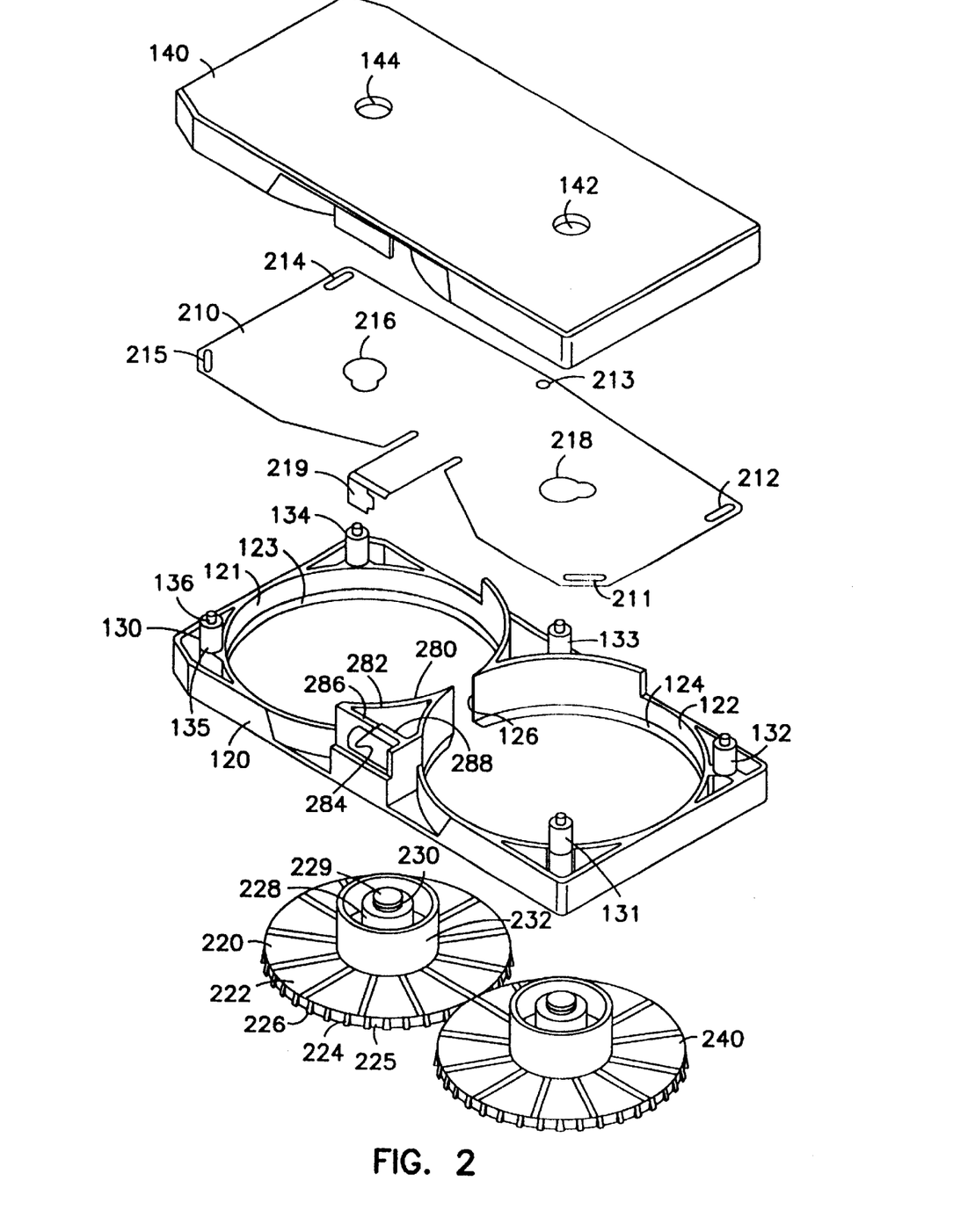
FIG. 2 shows an exploded isometric view of a two hub tape cartridge with two full tape packs.

FIG. 2 shows an exploded isometric view of a two hub tape cartridge 100. As mentioned previously, the tape cartridge 100 includes a base 120 and a cover 140. As shown in FIG. 2, the tape cartridge also includes a retainer or latch 210, as well as a first hub 220 and a second hub 240. The hubs 220 and 240 are essentially the same and have similar features and, therefore, only one hub will be described in detail. It should also be noted that the first hub 220 and the second hub 240 are shown devoid of tape in this particular view. This is so that the hubs 220 and 240 may be more clearly described. In this particular tape cartridge, as will be seen in future figures, hubs 220 and 240 each contain a substantially full tape pack while in the assembled cartridge. The base includes a pair of openings 121 and 122, which are sized to receive the hubs 220 and 240. The opening 121 includes a conical receiving surface 123. The opening 122 also includes a conical receiving surface 124. Between the openings 121 and 122 is a slot 126. In an assembled tape cartridge 100, the first hub 220 includes a full tape pack and the second hub 240 includes a full tape pack of magnetic tape. The first tape pack is connected to the second tape pack through the slot 126 in the base 120. The base also includes a series of locking posts 130, 131, 132, 133 and 134. Each of the locking posts includes a main body 135 and a neck 136. The main body 135 spaces the latch or retainer 210 from the base. The retainer attaches to or is latched to the neck 136 of each of the locking posts 130, 131, 132, 133 and 134.

The first hub 220 and the second hub 240 are substantially similar in their design, so only the first hub 220 will be described in any detail. The first hub 220 has a single flange 222. The single flange 222 includes a beveled or conical edge 224. The beveled edge 224 includes recesses 225 therein. The recesses 225 result in a plurality of teeth 226 which are located along the beveled or conical edge 224 of the flange 220. The recesses 225 and teeth 226 can be equally spaced apart or can be unequally spaced apart. When unequally spaced, the pitch of the gear is varying and this allows for easier meshing of the beveled or conical edge 224 of the first hub with the beveled or conical edge of the second hub 240. The hub 220 also includes an axle 228. The axle 228 includes a cylindrical head 229. The cylindrical head 229 includes a slot 230 which have substantially parallel surfaces. The slots are located between the axle 228 and the top of the head 229. The hub 220 also includes a drum 232 which is attached to the flange and which has an outside radius which is larger than the axle. The drum 232 is substantially hollow. The inner diameter of the drum 232 is also larger than the diameter of the axle 228. In an assembled tape cartridge 100, a flexible tape medium is wrapped onto the drum 232 of the hub 220. Similarly, the hub 240 has a similar drum-and-axle arrangement.

The retainer or latch 210 is comprised of a flat piece of material having a series of slots 211, 212, 213, 214 and 215 therein. The slots 211, 212, 213, 214 and 215 engage the necks of the locking posts 131, 132, 133, 134 and 130, respectively. The retainer or latch 210 also includes two other openings 216 and 218. The openings 216 and 218 include a central opening as well as a notch. The notch is sized such that it is able to slide within the slots 230 on the axle 228 of the hub 220 or 240.

To assemble the tape cartridge 100, the first hub 220 and the second hub 240 are positioned within the first opening 121 and the second opening 122. The beveled conical edge 224 of each of the hubs nests within the conical receiving surfaces 123 and 124, respectively. In other words, the beveled conical edge 224 of the flange 222 centers each of the hubs 220 and 240 within the base 120. In an assembled position, the two hubs 220 and 240 have full tape packs and magnetic tape is wound in one direction on the first hub 220 and in the opposite direction on the second hub 240. Tape passes through the slot 126 in the base in an assembled tape cartridge 100. Once the first hub 220 and the second hub 240 are positioned within the base 120, the retainer or latch 210 is positioned so that the openings 211, 212, 213, 214 and 215 engage the locking posts 131, 132, 133, 134 and 130, respectively. In addition, the openings 216 and 218 within the retainer 210 pass over the heads 229 of the flange 222 of both the first hub 220 and the second hub 240.

Both of the hubs 220, 240 are engaged at the same time or substantially simultaneously. This allows both of the hubs 220, 240 to be released at the same time or substantially simultaneously. The retainer 210 is moved in two directions to engage the hubs 220, 240. This requires that the retainer 210 be moved in a first motion and a second motion to release the hubs 220, 240. The two motions prevent inadvertent release of the hubs 220, 240 from the tape cartridge 100. If, for example, the hubs 220, 240 could be released using a single motion, an inadvertent bump could replicate the motion and the hubs 220, 240 could be released. This would be catastrophic if the tape cartridge was in a library and a picker happened to accelerate the tape cartridge to replicate the motion. Two motions of the retainer 210 are required to lessen the chance of such an occurrence. The requirement of two motions virtually eliminates the chances of an inadvertent release of the hubs 220, 240.

The two motions of the retainer 210 can be virtually any two motions. There can be two sliding motions of the retainer 210; or a rotating motion of the retainer in combination with a lifting motion of the finger 219; or any other combination of two motions. In the preferred embodiment shown in FIG. 2, the retainer 210 rotates and the finger 219 is lifted between a latched and unlatched position. The base 120 of the tape cartridge 100 includes a triangularly shaped strut 280. The triangularly shaped strut 280 includes a surface 282 over which the flat portion of the finger 219 passes when the retainer 210 rotates. One side of the triangularly shaped strut 280 includes a step 284 which serves as a latching mechanism for the finger 219. The step 284 in the one side of the triangularly shaped strut 280 forms a first ledge 286 and a second ledge 288. The finger 219 is dimensioned so that it can fit on the first ledge 286 or on the second ledge 288. When the finger 219 is positioned on the second ledge 288 the retainer is in the second or release position where the hubs 220, 240 can be released from the tape cartridge 100 or put into the tape cartridge 100. When the finger 219 is positioned on the first ledge 286, the retainer 210 is in a second or locked position.

The openings 211, 212, 214, 215, 216, and 218 are shaped so that they engage locking posts 131, 132, 134, 135, and the slot 230 of the first hub 220 and the slot 230 of the second hub 240, respectively when the retainer 210 is rotated. The opening 213 in the retainer 210 fits over the locking post 133. The retainer 210 pivots around locking post 133. To assemble or add two hubs 220 and 240 to the cartridge 100, the finger 219 is positioned over ledge 286 so that the retainer 210 is in the release position. The two hubs 220, 240 are inserted into the openings 121 and 122 of the base 120 and the tape strand between the two hubs 220, 240 is passed through the slot 126. Once positioned so that the head 229 of each of the two hubs 220, 240 is within the openings 216 and 218 of the retainer 210, the finger 219 is moved from the second or release position to a locking position. In the locking position where the finger 219 is atop the ledge 286, notches in the openings 216 and 218 engage the slots 230 in each of the hubs 220, 240. The finger 219 is formed from a spring type material. As a result, the finger 219 is biased toward the ledge 286 and will not go over the step 284 unless lifted over the step. Thus, the step 284 in combination with the biased finger 219 serve as a latching mechanism to keep the retainer 210 in its locked position.

To release the hubs 220, 240 from the tape cartridge 100, the finger 219 is moved from the first position atop ledge 286 to the second position atop ledge 288. The second position is the release position where the notches in the openings 216 and 218 disengage from the slots 230 in each of the hubs 220, 240. Once the notches in the openings 216 and 218 disengage the slots 230 in the hubs 220, 240, both hubs 220, 240 release at about the same time. As mentioned previously, the finger 219 is formed from a spring type material so that it is biased toward the ledge 286 so that it stays in the locked or first position. To release the hubs 220, 240 the finger 219 is lifted over the step 284 and rotated to the release position where the finger 219 is positioned over the ledge 288. Two motions, a lifting of the finger 219 and rotation of the retainer 210, are thus required to release the hubs 220, 240 from the tape cartridge 100.

Again it should be noted that to release the hubs 220, 240 from the tape cartridge 100, the retainer 210 undergoes two or more motions because it is absolutely critical that the first hub 220 and the second hub 240 remain attached to the base during inadvertent shock-loading events. In other words, if the cartridge 100 should undergo a sudden motion or even any motion so that the retainer 210 moves in one direction with respect to the base, it would be catastrophic if the first hub 220 and the second hub 240 inadvertently dropped out of the cartridge. Therefore, a two motion release is used to assure or lessen the possibility of this happening. For example, if the tape cartridge 100 should be used within a tape library, the picking mechanism that is generally used, picks and moves tape cartridges quickly and, therefore, the cartridge 100 would undergo large forces which might cause the hubs to be removed inadvertently from the cartridge in the absence of a two-motion or multi-motion retainer 210 release.

Figure 3:
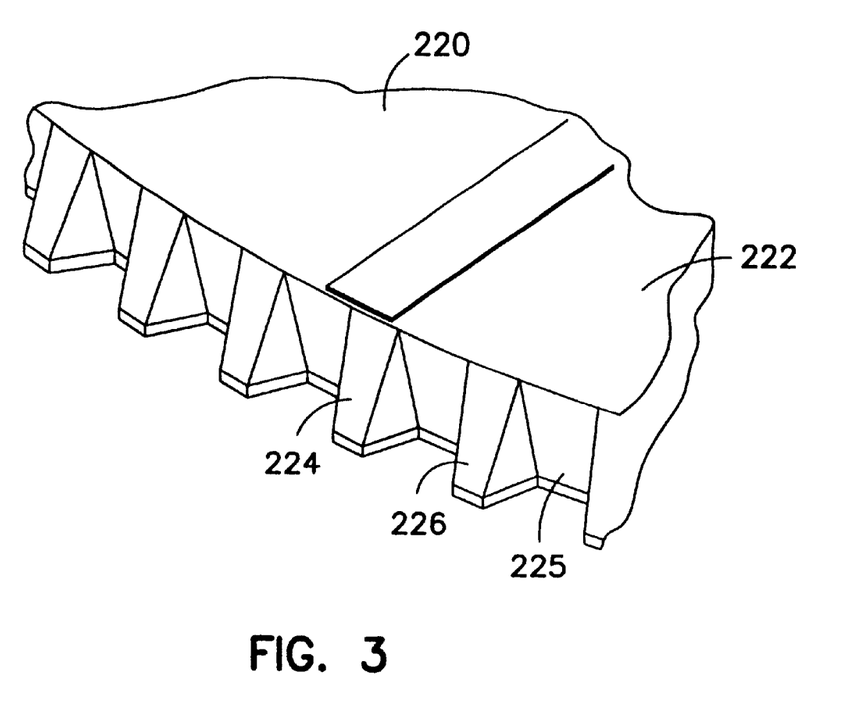
FIG. 3 shows a perspective view of the conical edge of one of the first and second hubs.

FIG. 3 shows a perspective view of the conical edge 224 of the flange 222 of the hub 220. As can be seen, the teeth 226 form from the beveled conical edge actually produce the bevel into which the hub 220 nests into the opening 121 or 122 of the base 120. The recesses 225 which form the teeth, remove a portion of the flange 224. The recessed portion is substantially perpendicular to the flange 222.

Figure 4:
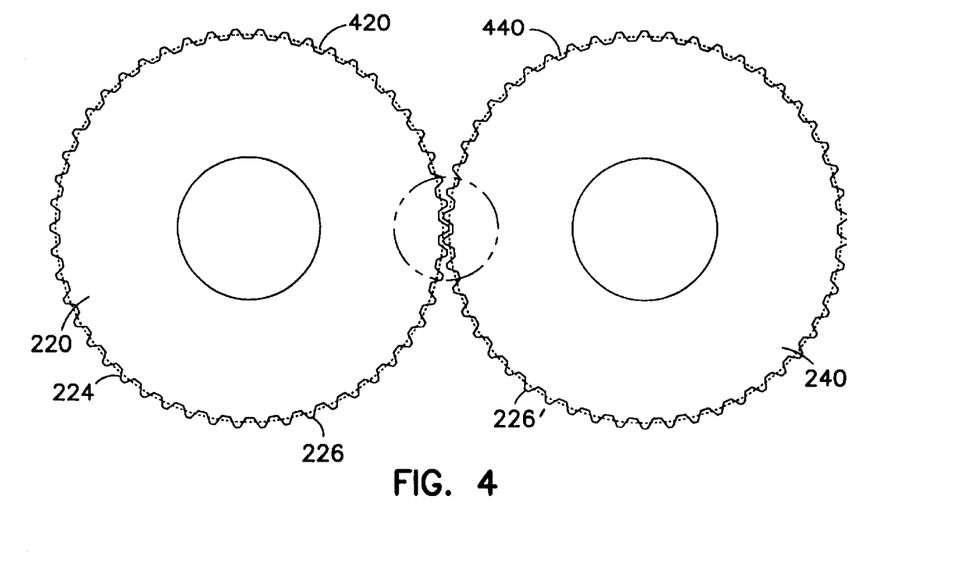
FIG. 4 shows a top view of a two full tape packs of the tape cartridge.
Figure 5A:
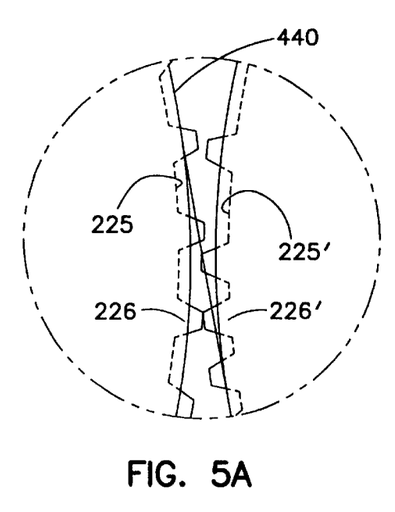
FIG. 5A shows a close-up view of the area where the two hubs of the tape drive contact one another.
Figure 5B:
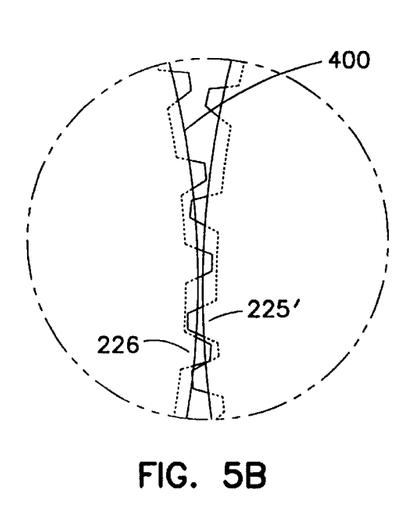
FIG. 5B shows a close-up view of the area where the two hubs of the tape drive contact one another and where the teeth on the conical flange of one hub engage on the recesses on the conical flange of the other hub.

FIG. 4 shows a top view of the first hub 220 and the second hub 240 as positioned within the base 120. As shown, hub 220 contains a full tape pack 420 and the second hub 240 contains a full tape pack 440. The full tape pack is depicted by a dotted line near the beveled conical edge 224 of the flange. The magnetic tape 400 is wound onto the first hub 220 in a counterclockwise direction or in a first direction, and wound onto the second hub 240 in a clockwise direction or in a second direction. The tape thus crosses at the point where the teeth 226 of the first hub meet or intersect with the teeth 226' of the second hub 240. It is important that the teeth 226 of the first hub 220 engage the recesses 225' of the second hub 240. When the two hubs 220 and 240 engage in this fashion, the hubs 220 and 240 become fully nested into the first conical receiving surface 123 and the second conical receiving surface 124 of the first opening 121 and the second opening 122, respectively. When the first hub 220 becomes engaged with the second hub 240, the flanges or the edges support the tape strand 400 that is located between the first tape pack 420 and the second tape pack 440. This is best illustrated in FIGS. 5A and 5B which show a close-up of the area where the two hubs of the tape drive contact one another. In FIG. 5A, the teeth separate the first hub 220 from the second hub 240. In operation, the teeth 226 of the first hub 220 are in interference with the teeth 226' of the second hub 240. The result is that the tape strand 400 between the first tape pack 420 and the second tape pack 440 is not fully supported. In addition, the cartridge 100 would not be fully sealed since there is a possibility that extraneous matter could enter the cartridge between the recesses 225 and 225'. FIG. 5B shows that the teeth 226 of the first hub are engaged with the recesses 225' of the second hub 240. The end result is that the tape strand 400 is fully supported and the two hubs form a sealed tape cartridge 100.

FIGS. 5A and 5B also illustrate an approach for expediting the engagement of the gears or teeth from the first hub 220 and the second hub 240. In order to expedite the meshing or engagement of the teeth of one hub into the recesses of the other hub, it is contemplated that the teeth be formed with unequal spacing so that the teeth of one hub engage the recesses of the other hub in less time than if the teeth were evenly spaced. As shown in FIG. 5A, the teeth 226' are not equally spaced on the second hub 240. Initially, one tooth 226' of the second hub 240 actually interferes with one of the teeth 226 of the first hub in FIG. 5A. The next tooth 226' of the second hub 240 is positioned to engage a recess 225 of the first hub 220. In other words, the two tape hubs 220, 240 after being apart in a tape drive, may initially interfere or clash. If they initially clash, they continue to clash until an unevenly spaced tooth 226' engages a recess 225 as the two hubs are rotated.

Uneven pitch spacing of the teeth must be added for a functional quick nesting system. Since tape tension on the s-wrap must be maintained at all times, an evenly spaced tooth pattern creates an over constrained system. Uneven spacing of the teeth allows them to mesh within one revolution of the two hubs, resulting in 0.0006" diametral uncertainty. This only works if the hubs are identical; since they turn in opposite directions they "backtrack" each other. Hubs that are mirror images of each other could conceivably clash, if presented in a mirror-perfect orientation, just as evenly spaced tooth hubs would.

Advantageously, the hubs with unevenly spaced teeth allow the conical flanges of two full tape hubs to overlap and to quickly nest into a hub holding device or shell. This allows the two full, removable hubs to nest properly in the shell. This also allows the tape packs on the hubs be nearly in direct contact with each other so the s-wrap (tape strand between packs) will be of a length that will clear the opening in the shell.

A further advantage is that the nesting occurs quickly so that the "center wind" of the drive stays within specifications.

If the teeth 226 and 226' are evenly spaced, they will eventually mesh. The problem is that the teeth 226 and 226' may mesh after the two tape pack diameter ratio is well out of spec of the center line required for the drive. If the hubs have evenly spaced teeth or two hubs with the same pitch when the two tape hubs come together after being apart in the tape drive, if the teeth initially clash, they will continue to clash as the two hubs are rotated in order to "find" a tooth mesh. The teeth will inevitably mesh, but not until after the two-tape pack diameter ratio is well out of spec of the "center wind" required for the drive, which typically is held to a few wraps of tape, or about 0.002". The amount of rotation required is directly proportional to the number of the teeth. A 56-toothed hub would require a .04" change in diameter to allow evenly-spaced teeth to mesh. This would require about 133 revolutions of each hub, eating up valuable drive time. The 0.04" uncertainty directly translates to the diametral amount of tape wasted to prevent the drive from winding tape off the end of a hub in a catastrophic "dis-attach" of the tape.

Figure 6:
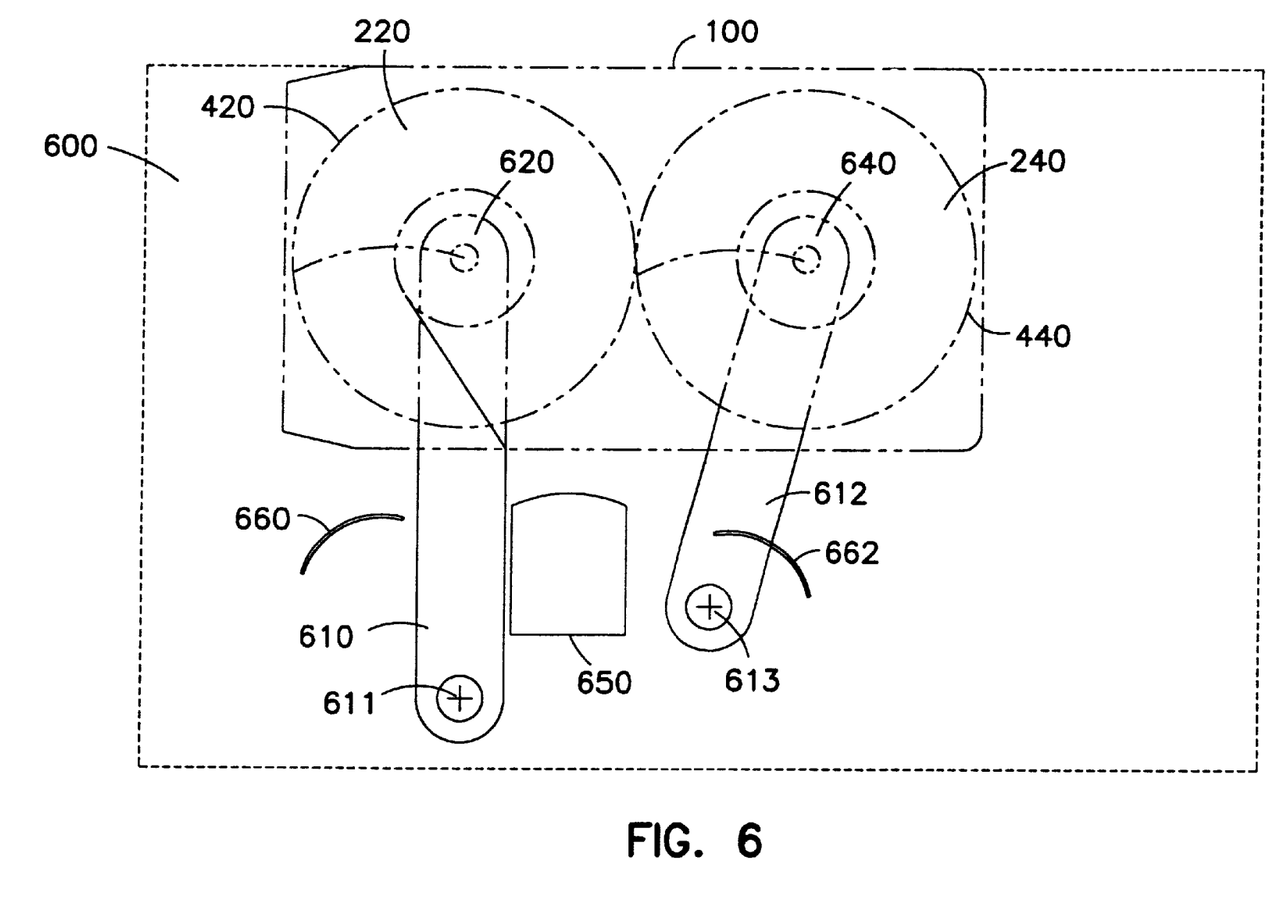
FIG. 6 shows a top view of the tape cartridge with the spindles positioning the hubs of the tape cartridge in a hub receiving position.

FIG. 6 shows the top view of a tape cartridge 100 as positioned within a tape drive 600. The tape drive 600 includes a pair of spindles 620 and 640 which engage the hubs 220 and 240. The spindles 620 and 640 are mounted on arms 610 and 612. Arm 610 includes spindle 620. Arm 612 includes spindle 640. The tape drive 600 also includes a magnetic tape head 650 as well as a first tape guide 660 and a second tape guide 662 which are positioned near the magnetic head 650. The arms 610 and 612 are each pivotally mounted to the tape drive 600. Arm 610 pivots about an axis 611 while arm 612 pivots about an axis 613. As shown in FIG. 6, the arms 610 and 612 are in a first position or a hub-receiving position. The spindles 620 and 640 located on the ends of the arms 610 and 612 are positioned so that they can engage the spindles 220 and 240 in the spindle-receiving position.

Figure 7:
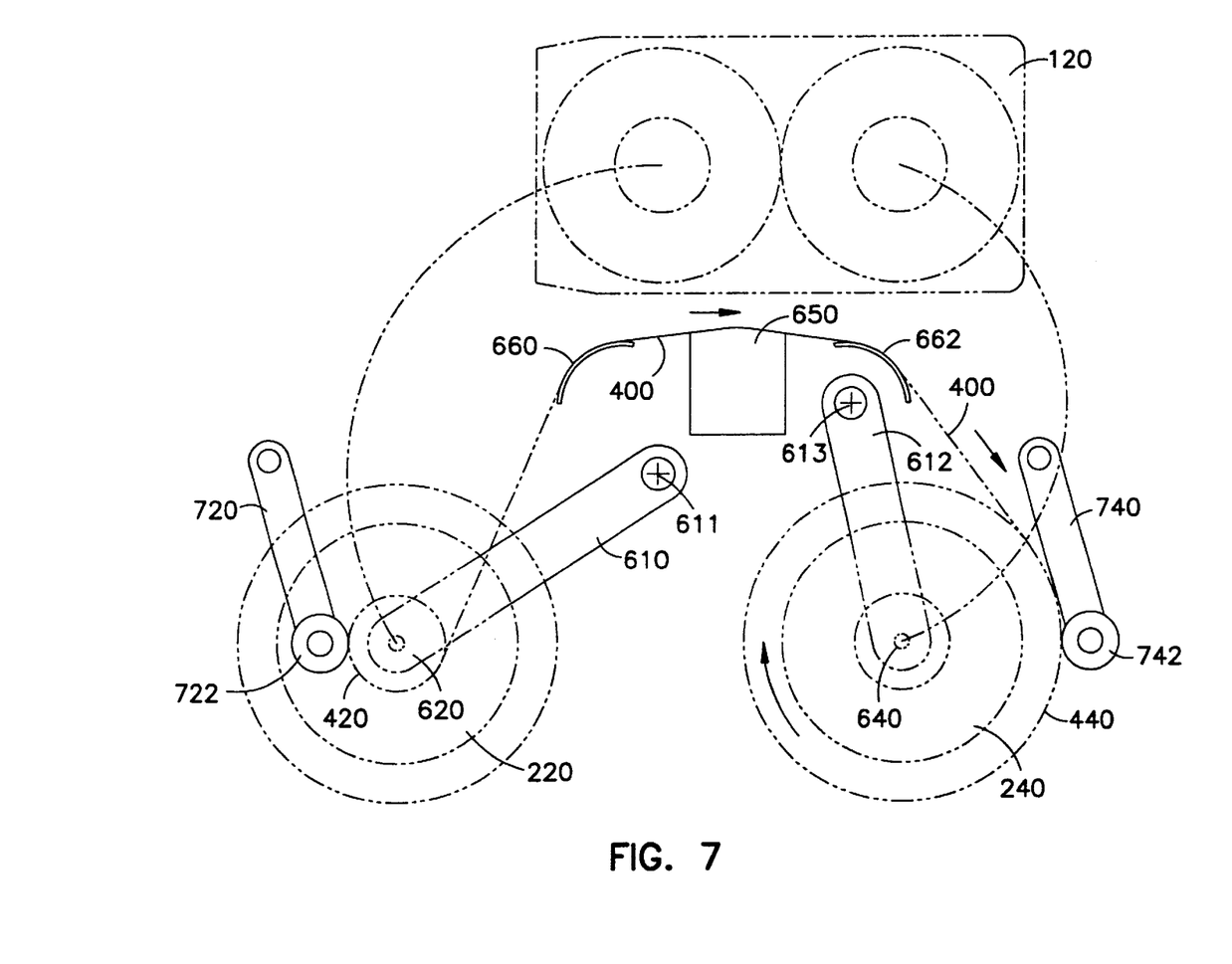
FIG. 7 shows a top view of the tape cartridge and tape drive with the spindles positioning the hubs of the tape cartridge in a functional position.

FIG. 7 shows a top view of a tape cartridge 100 with the spindles positioning the hubs of the tape cartridge 100 in a functional position. In the functional position, the hubs 220 and 240 have been removed from the tape cartridge 100, leaving the base 120 in one portion of the drive 600. The spindles 620 and 640 with their attached hubs 220 and 240, respectively, are moved into a functional position where the tape 400 is positioned over a first tape guide 660, the magnetic head 650 and the second tape guide 662. The arms 610 and 612 rotate about axes 611 and 613, respectively. The tape drive 600 also includes a first pack arm 720 and a second pack arm 740. The pack arms 720 and 740 include a roller 722 and 742 which is biased against the tape pack 420 and 440, respectively.

Air can be entrapped between the layers of tape in multiple layers of the tape as it is wrapped onto a hub. The tension of the tape produces a force that attempts to push the air out from between the layers. The force is counteracted by the bleed time of the air entrapped between the layers. It generally takes a period of time for the air entrapped between the layers to flow and escape from between the layers. During the period of time while the air is flowing from between the layers of tape, the tape is floating and not in a definite position. Under normal operating conditions, this amount of time corresponds to the time it takes to wrap approximately five to six layers of tape. Whether the tape floats also depends on the roughness of the tape surface. Surface speed is also a factor in whether the tape floats. Adjacent layers fixed with respect to each other when they become pinned. The layers become pinned when the points of the surface of one tape contact the points of the surface of the other, adjacent tape. When the air film is thicker than the two combined surfaces, the tape will float and will not be stable. The tape will not become pinned until the air film between adjacent tape surfaces is thin enough to allow the two surfaces to become pinned. Popped strands are tape strands that do not lay directly over the layer of tape below the popped strand. While the tape is floating or unpinned, the tape may react to a force that causes the tape to move sideways until it is restrained by a flange on the hub or some other obstruction. When the tape does move as described above it is called a popped strand. In other words the tape pops out of place.

There are several ways to minimize the problem of popped strands. One way is to slow down the winding of the tape to allow sufficient time for the layers of tape to become pinned and not float. Another way of minimizing the problem of popped strands is to use rollers to force the air out from between the layers in a shorter amount of time. Rollers can be flat rollers or crowned rollers. Crowned rollers place a high force at a point on the wound tape. Flat rollers place a force along a line across the tape. The rollers iron out the air causing the tape to pin and prevent the adjacent layers of tape from floating.

Pack arms 720 and 740 carry the rollers and add a force to the squeeze iron out any air that might be trapped between layers of tape as the tape is wound onto the hub 220 or 240. The pack arms prevent or lessen popped strands by forcing the air film between layers more quickly. In other words, the pack arms 720 and 740 and their associated rollers force the air film out faster which causes adjacent layers of tape to become pinned more quickly. The minimization or elimination of popped strands is desirable. Popped strands cause edge wear on the tape. Popped strands also cause tracking errors since the tape can move from side to side with respect to the surface of the flange and with respect to the magnetic head.

Another advantageous feature of this drive is that the spindle 620 and the spindle 640 can be moved to reduce the angle over the tape head when tapes travel over the magnetic head 650 at high speeds. In FIG. 7, the arms 610 and 612 and associated spindles 620 and 640 are in a functional position that may be associated with a relatively low speed travel for the tape 400 over the magnetic head 650. In the event that the tape 400 is required to pass over the guide 660, the head 650 and the other guide 662 at a faster speed, the arms 610 and 612 can be rotated toward the tape cartridge or base 120 that remains in the drive to reduce the angle and reduce the wear on the tape. By reducing the angle with respect to the guides 660 and 662, as well as with respect to the head 650, wear is reduced on the tape 400.

Figure 8:
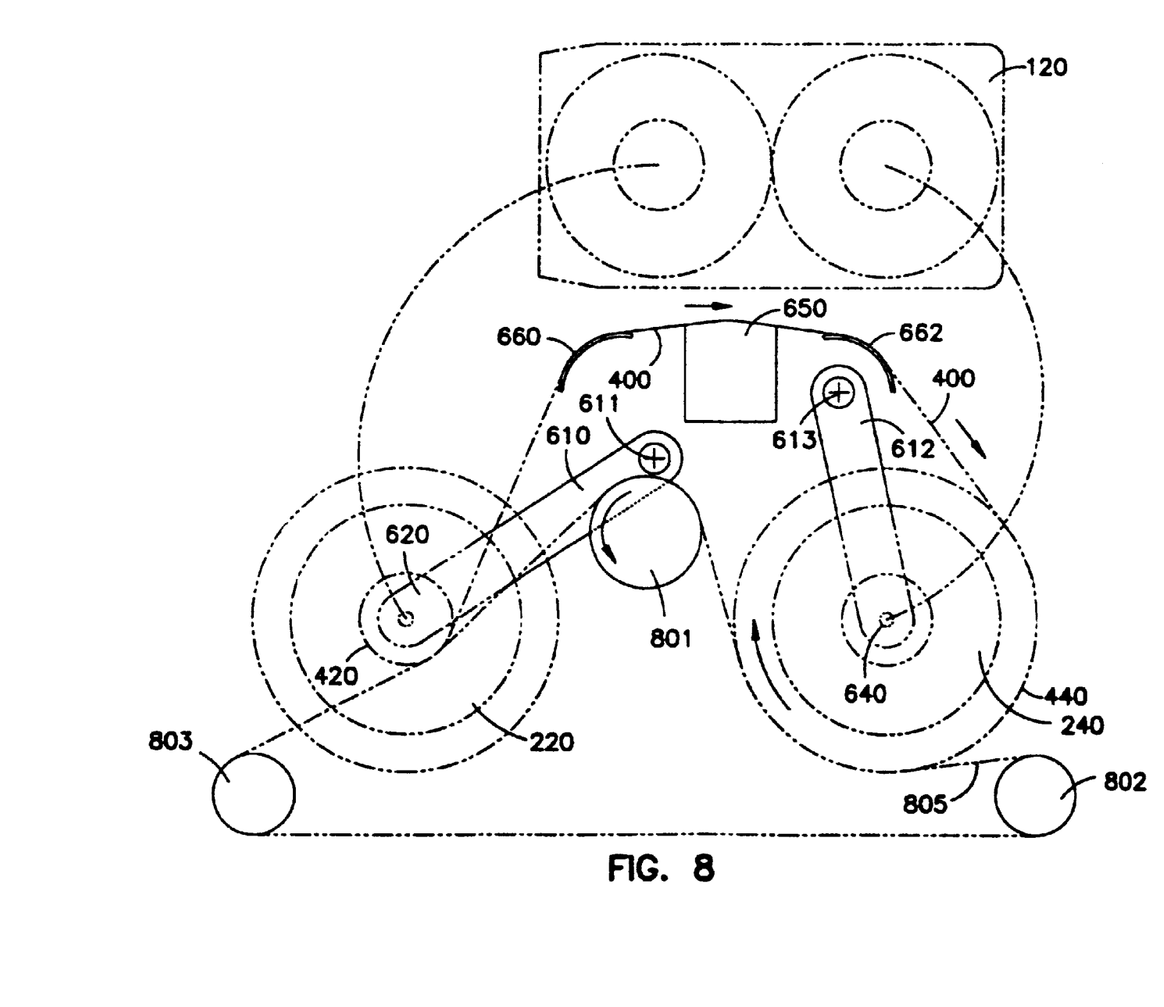
FIG. 8 shows a tape drive which uses a belt to minimize or lessen problems associated with popped strands.

As shown in FIG. 8, rather than having tape pack arms 720 and 740, a belt system 800 can be substituted for the pack arms 720 and 740.

The belt/system 800 includes a first pulley 801, a second pulley 802, and a third pulley 803. A belt 805 passes over the first pulley 801, the second pulley 802 and the third pulley 803. The belt contacts the tape pack 440 on the second hub 240 and forces or squeezes any air that might be trapped between the layers of the tape as the tape is wound onto the hub 240. The belt 805 is also in contact with the smaller tape pack 420 of the hub 220. By having the belt 805 in contact with the tape pack 440, air entrapped between the layers of tape is forced out so that popped strands or tape movement between the various layers is minimized. As shown, the hub 801 is turning in one direction while the tape is being wound onto the spindle 240. The spindle 501 is turned in the opposite direction thereby moving the belt 805 in the opposite direction when the tape is being wound onto the spindle 220. The tension on the tape 805 is maintained so that air may be removed or squeezed out from between the layers in the tape pack. Therefore, the tape is pinned to bottom layers and popped strands are minimized.

Figure 9:
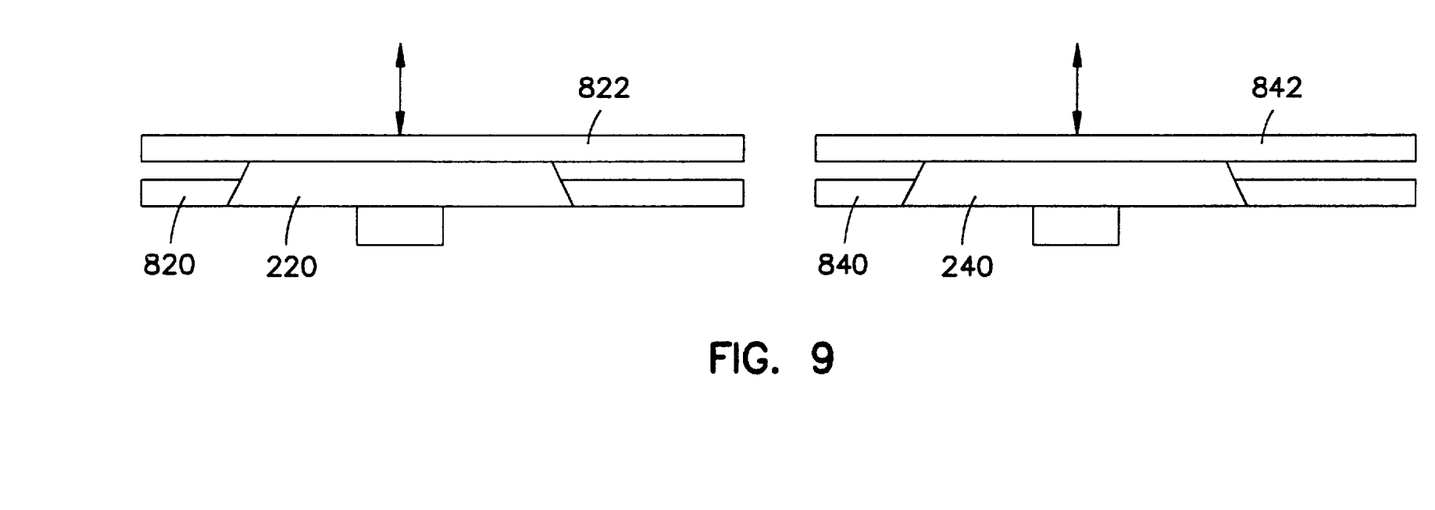
FIG. 9 shows a side view of the tape drive with the spindles positioned so the hubs of the tape cartridge are in a read position.

FIG. 9 illustrates a set of flange extensions 820 and 840 which are associated with the hub 220 and hub 240. The hub extension 820 engages the teeth 224 and 226 of hub 220 and the teeth 226' the hub 240. A second flange 822 for hub 220 is positioned within the tape drive. The second flange is mounted so that it can be brought down into contact with the hub 220. The outer edges or outer circumference of the second flange 822 and the flange extension 820 bound the tape that is wound on the hub 220. The flange extension 820 and the flange 822 prevent the tape from moving laterally and therefore minimize popped strands. Similarly, associated with hub 240 is a second flange 842 which is located within the tape drive and which can be moved into place adjacent the hub 240. The flange of the second portion 842 and the flange extension 840 bound the tape as it is wound onto the hub 240.

In operation, tape packs must be removed from the tape cartridge 100 since there is no room in the container to shuttle tape from one hub 220 to a second hub 240. The flexible recording tape on the first rotatable hub and on the second rotatable hub hold information representing data. The data is accessible only when the first hub and the second hub are removed from the tape cartridge 100. The first rotatable hub and the second rotatable hub are inoperable unless removed from the cartridge since tape can not be shuttled from the first hub 220 to the second hub 240, or vice versa. Of course, the first rotatable hub 220 and the second rotatable hub 240 are replaceable with respect to the tape cartridge 100.

The drive spindles are mounted on the arms 610 and 612 so they can move from a hub-receiving position to a functional position. The hub-receiving position is shown in FIG. 6 and the functional position is shown in FIG. 7. This cycle is required to load the tape 400 into the tape drive 600. Initially, the cartridge 100 is lowered onto the spindles 620 and 640, attached to the ends of the arms 610 and 612, respectively. The hub 220 is latched to the spindle 620. The hub 240 is latched to the spindle 640. Once the spindles are latched to the hubs 220 and 240, the cartridge latch or retainer 210 is released by moving the retainer in a first direction and a second direction. The retainer 210 is moved by placing a force on the tab 219 of the latch or retainer 210. Once accomplished, either the spindle arms 610 and 612 are lowered, or the empty container or empty cartridge 100 is raised. The arms 610 and 612 are then rotated into their functional position, as shown in FIG. 7 and the tape 400 is passed over a first guide bearing 660, a second guide bearing 662 and the magnetic head 650, all of which are positioned within the tape drive 600. The last movement allows the tape 400 to be wrapped around the magnetic head 650 and the guides 660 and 662 of the tape drive 600. The load cycle takes approximately 1 to 3 seconds. Advantageously, this load cycle is faster and more reliable than the cycles required to load a single real cartridge onto the drive. The reason for the increased speed and reliability is that there is no tape threading required.

Advantageously, the long tape span helps with guiding and tracking. In addition, the arms 610 and 612 can be rotated to different angles depending upon the speed at which the tape is being passed over the guides 660 and 662, as well as the magnetic head 650, so as to prevent excessive wear on the tape 400. In the functional position, where the tape 400 can be read from or written to pack arms 720 and 740, a belt 800 or flange extensions 820 and 840 (not shown as yet in the figure), may be used to control tape pack formation. In other words, the flange extensions 820 and 840, or pack arms 720 and 740, can be used to efficiently pack the tape and form good tape packs 420 and 440. Use of pack arms 720 and 740 allow for very fast tape movement without "popped strands", thus improving tape tracking. With this approach, up to 31% of the tape cartridge 100 could be devoted to tape. The same shape could be maintained with respect to other cartridges. Other shaped cartridges could have a high percentage of volume of tape, approximately in the range of 40–50%. The additional volume comes from having two substantially full hubs 220 and 240 (illustrated in FIG. 11 below). In addition, a wider tape can be used since there is no need for a second flange on each hub and the clearance necessary for the second flange. There is also no need clearance for the flanges on the hubs 220 and 240 since these hubs do not rotate within the cartridge. The tape cartridge 100 can also be more ruggedly built with thicker walls and no need for door mechanisms that open to allow access to the tape within the tape cartridge 100. The mechanical structure is more rugged and robust and easier to build. Furthermore, with two full tape hubs, the tape cartridge is better able to withstand shock loading. Thus, an additional advantage is that the two hub tape cartridge could become much more volumetrically efficient. In other words, today's tape drives devote less than 10% of their total volume to holding tape. The tape drive described herein could carry anywhere from 30–50% of the volume devoted to tape. The volume devoted to tape in the tape cartridge 100 could also range somewhere from 10–65% of the total volume of the tape cartridge.

Figure 10:
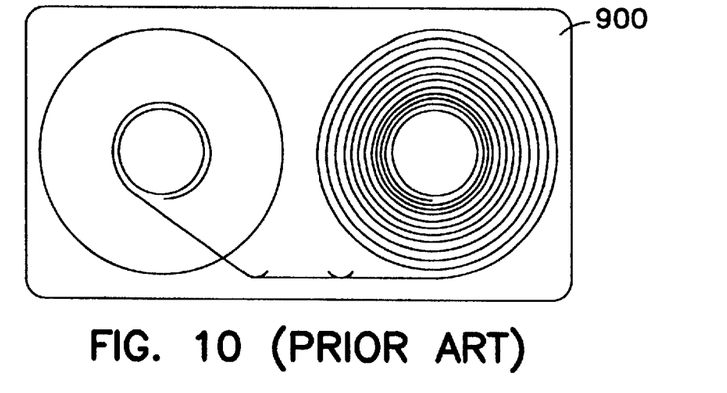
FIG. 10 shows a top view of a tape cartridge 900 of the prior art with all the tape within the cartridge wound onto one hub.
Figure 11:
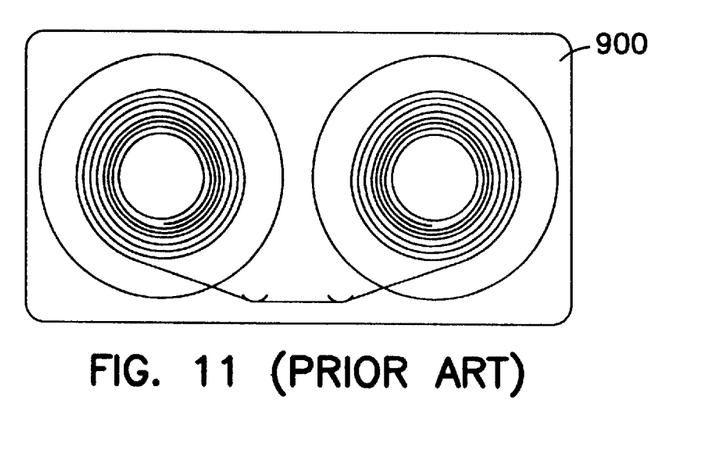
FIG. 11 shows a top view of a tape cartridge 900 of the prior art with equal amounts of the tape within the cartridge wound onto the first hub and onto the second hub.
Figure 12:
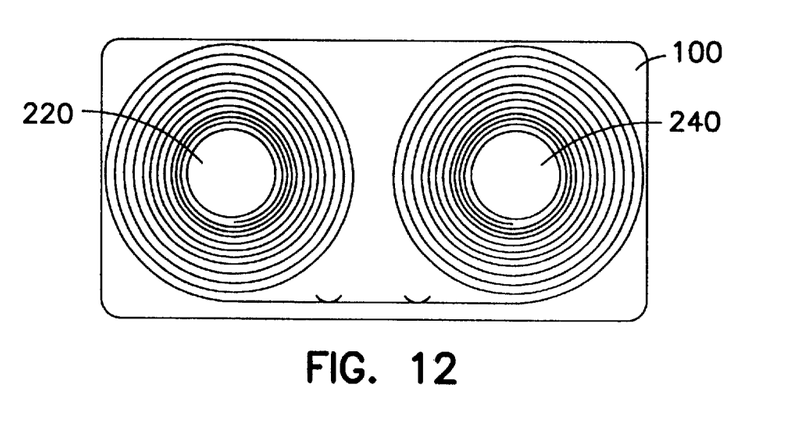
FIG. 12 shows a top view of a tape cartridge 100 with the tape within the cartridge wound onto the first hub and onto the second hub.

FIGS. 10 and 11 show a tape cartridge 900 of the prior art. In prior art cartridges 900, the hubs 920, 940 must be able to rotate. As shown in FIG. 10, the amount of tape 910 held in the prior art cartridges is limited by the amount that is held on one hub 920 or 940 since the tape may need to be wound on one of the hubs to access data on one or the other ends of the tape. As shown on FIG. 11, an equal amount of the tape is wrapped onto each of the hubs 920 and 940. The hubs 920 and 940 can not be full since they are designed to rotate. In In contrast, as shown in FIG. 12, each of the hubs 220 and 240 are entirely full. This accounts for much of the increase in the volumetric efficiency of the tape cartridge 100 of this invention. Other factors are discussed above. Still another factor is that the tape cartridge 100 does not need tape guides and other mechanisms for routing the tape through the tape cartridge 100.

Advantageously, inventive two hub tape cartridge has two hubs each of which holds a full tape pack. The resulting two hub cartridge holds a higher volume of tape with respect to the volume of the tape cartridge than current two hub cartridges. The volumetric efficiency of the inventive two hub tape cartridge is increases as is the volumetric efficiency of a tape library which uses such a cartridge. The two hub cartridge can be center parked so that access to data is minimized. In addition, the inventive two hub cartridge has less parts than current two hub cartridge designs and is therefore, less expensive and easier to manufacture. The drive also mounts the hubs from the two hub cartridge onto moveable spindles. The spindles move from a load position or hub removal position to a functional position. As they move to the functional position, the tape is wrapped around the head and the guides of the tape drive. This load cycle is faster and more reliable than the load cycle associated with a single hub cartridge since no tape threading will be required.

What is claimed is:

1. A tape cartridge comprising:

a first rotatable hub;

a second rotatable hub; and a flexible recording tape wound upon the first rotatable hub and the second rotatable hub, the first hub substantially full of the flexible recording tape and the second hub substantially full of the flexible recording tape;

wherein the first rotatable hub and the second rotatable hub are removable from the cartridge, wherein the tape on one hub cannot be wound onto the other hub without removing the hubs from the cartridge.

2. The cartridge of claim 1 further comprising:

a base;

a latch for engaging the first rotatable hub and the second rotatable hub, said latch attaching to the base; and a cartridge cover for attaching to the base.

3. A tape cartridge comprising:

a first rotatable hub;

a second rotatable hub; and a flexible recording tape wound upon the first rotatable hub and the second rotatable hub, the first hub substantially full of the flexible recording tape and the second hub substantially full of the flexible recording tape;

wherein the first rotatable hub and the second rotatable hub are replaceable with respect to the cartridge, wherein the tape on one hub cannot be wound onto the other hub without removing the hubs from the cartridge.

4. A tape cartridge comprising:

a first rotatable hub;

a second rotatable hub; and a flexible recording tape wound upon the first rotatable hub and the second rotatable hub, the first hub substantially full of the flexible recording tape and the second hub substantially the flexible recording tape;

wherein the first rotatable hub and the second rotatable hub are inoperable unless removed from the cartridge, wherein the tape on one hub cannot be wound onto the other hub without removing the hubs from the cartridge.

5. A tape cartridge comprising:

a first rotatable hub;

a second rotatable hub; and a flexible recording tape wound upon the first rotatable hub and the second rotatable hub, the first hub substantially full of the flexible recording tape and the second hub substantially full of the flexible recording tape; wherein the flexible recording tape on the first rotatable hub and on the second rotatable hub hold information representing data, the data being accessible only when the first hub and the second hub are removed from the cartridge, wherein the tape on hub cannot be wound onto the other hub without removing the hubs from the cartridge.

6. A tape cartridge comprising:

a first rotatable hub including a first flange with a first conical edge;

a second rotatable hub including a second flange with a second conical edge; and a flexible recording tape wound upon the first rotatable hub and the second rotatable hub, the first hub substantially full of the flexible recording tape and the second hub substantially full of the flexible recording tape.

7. The cartridge of claim 6 wherein the cartridge includes a first opening with a conical receiving surface and a second opening with a conical receiving surface, said first opening with a conical receiving surface for receiving one of the first rotatable hub and the second rotatable hub, and said second opening with a conical receiving surface for receiving the other of the first rotatable hub and the second rotatable hub.

8. The cartridge of claim 6 wherein:

the first conical edge has a first plurality of reliefs therein to form conical teeth therein, and the second conical edge has a second plurality of reliefs therein to form conical teeth therein, wherein the conical teeth of one of the first and second hubs engaging the reliefs of the other hub.

9. The cartridge of claim 8, wherein the teeth of one of the first and second hubs are unevenly spaced.

10. The cartridge of claim 8, wherein the teeth of both the first and second hubs are unevenly spaced.

11. The cartridge of claim 8, wherein the teeth of the first hub is at a first pitch and the teeth of the second hub is at a second pitch, said first pitch different than the second pitch.

12. A tape drive for reading and writing to tape media within a tape cartridge comprising:

a transducing head for reading representations of data from the tape and for writing representations of data to the tape;

means for removing the first hub and second hub from the tape cartridge;

a first spindle attached to a first arm, said first arm moving the spindle between a hub receiving position and a functional position; and a second spindle attached to a second arm, said second arm moving the spindle between a hub receiving position and a functional position, said first spindle and the second spindle in a functional position when the tape is positioned near the transducer in a transducing relationship.

13. The tape drive of claim 12 further comprising:

a first hub flange extension for the first hub; and a second hub flange extension for the second hub, the first hub flange extension and the second hub flange extension providing capacity to the first hub and the second hub so that the tape on the first and second hub can be housed on one of the first hubs and the second hubs.

14. The tape drive of claim 12 further comprising:

a third arm; and a first tape packer mounted on the third arm, said first tape packer for packing tape onto the first hub.

15. The tape drive of claim 14 further comprising:

a fourth arm; and a second tape packer mounted on the fourth arm, said second tape packer for packing tape onto the second hub.

16. The tape drive of claim 12 wherein means for removing the first hub and second hub from the tape cartridge includes a mechanism for disengaging a latch on the tape cartridge, said latch for engaging the first rotatable hub and the second rotatable hub of the tape cartridge.

17. The tape drive of claim 12 further comprising an apparatus for moving the portion of the tape cartridge other than the first hub and the second hub and the tape wound thereon, relative to the first hub and the second hub.

18. A method for reading and writing to tape in a two hub tape cartridge comprising:

positioning the cartridge so that a first hub engages the a first spindle and so that the second hub engages a second spindle; and removing the first and second hubs from the tape cartridge.

19. The method of claim 18 further comprising replacing the first spindle and the second spindle into the tape cartridge.

20. The method of claim 18 further comprising moving the first spindle and the second spindle to a position where the tape between the first spindle and the second spindle passes over a transducing head.

21. The method of claim 20 further comprising:

positioning a first tape packer onto the tape pack of the first hub; and positioning a second tape packer onto the tape pack of the second hub.

22. The method of claim 20 further comprising:

positioning a first flange extension onto the first hub; and positioning a second flange extension onto the second hub.

23. The method of claim 18 wherein removing the first and second hubs from the tape cartridge further comprises releasing a latch used to engage the first hub and the second hub with respect to the tape cartridge.

* * * * *